United States Patent [19]

Kaneda et al.

[11] Patent Number: 4,807,212
[45] Date of Patent: Feb. 21, 1989

[54] CORRECTING FOR COMATIC ABERRATION IN AN OPTICAL HEAD OF AN OPTICAL DISK APPARATUS

[75] Inventors: Tokuya Kaneda; Akira Saito, both of Odawara; Masateru Watanabe, Chigasaki; Tomoji Osumi, Kanagawa; Nobuo Suzuki, Fujisawa, all of Japan

[73] Assignee: Hitachi, Ltd., Tokyo, Japan

[21] Appl. No.: 29,549

[22] Filed: Mar. 24, 1987

[30] Foreign Application Priority Data

Mar. 24, 1986 [JP] Japan ................... 61-64203

[51] Int. Cl.⁴ ............................. G11B 7/00
[52] U.S. Cl. ..................... 369/44; 369/45; 369/46; 369/105; 369/112; 250/201
[58] Field of Search .................. 369/43–47, 369/105, 112; 358/342; 250/201 DF

[56] References Cited
U.S. PATENT DOCUMENTS 4,725,721  2/1988  Nakamura et al. ............ 369/45 X Primary Examiner—Robert L. Richardson
Attorney, Agent, or Firm—Fay, Sharpe, Beall, Fagan, Minnich & McKee

[57] ABSTRACT

The present invention relates to an optical head of an optical disk apparatus and a method of making the same, and more particularly, to an optical head which projects a light spot onto a track recess, receives the reflected light of the light spot by at least two photoelectric converters and focuses the light spot based on a differential output from the photoelectric converters. The optical head can accurately focus the light spot even if the reflected light beams that are nonuniform in intensity due to the influence of the comatic aberration of a lens composing the optical head are projected on to the photoelectric converters. This is because the influence of the comatic aberration of the lens is corrected for by marking the direction of central parallel ones of S-like interference fringes on the lens and optically forming a predetermined angle between the marked direction and the direction of the track recess.

9 Claims, 5 Drawing Sheets

CORRECTING FOR COMATIC ABERRATION IN AN OPTICAL HEAD OF AN OPTICAL DISK APPARATUS

BACKGROUND OF THE INVENTION (a) Field of the Invention

The present invention relates to an optical head of an optical disk apparatus and a method of making the same, and more particularly to an optical head of an optical disk apparatus suitable for accurately focusing a light beam projected from the optical head and a method of making the same.

(b) Related Art Statement

As well known, the optical disk apparatus records and reproduces information on the optical disk surface by using an optical head. The information is recorded by projecting a light beam having its energy changed onto a track recess or between such recesses formed on the surface of the optical disk being turned, to form pits or the like on the optical disk surface. Also, the information thus recorded is reproduced by projecting a light beam of low energy onto the optical disk surface and detecting any change in intensity of the reflected light due to the existence of pits or the like. Therefore, for recording information along a desired track on the optical disk or for reproducing information from a desired track, it is necessary to position and focus the light beam with a high accuracy.

First, positioning of a light beam will be described below:

For positioning the light beam on a track with a high accuracy, it is necessary to detect how much the light beam deviates from the center of the track. For this purpose, methods have been proposed by which a change in intensity of the light reflected from the track recess is detected. Generally, these methods use a semiconductor laser as a light source because the apparatus should be compact. For example, assume that a near infrared ray of about 0.83 μm in wavelength is used as the semiconductor laser, then track pitch is 1.6 μm and the numerical aperture of objective lens is about 0.5. In this case, the intensity 1 of the reflected light from the track recess 12 is primarily a sum of the intensity 10 of basic diffracted light, intensity 11a of negative primary diffracted light and intensity 11b of positive primary diffracted light, as shown in FIGS. 1 (a) and (b). As shown in FIG. 1 (b) and in FIG. 2, the positive primary diffracted light 11b' and negative primary diffracted light 11a' appear close to each other. In FIG. 1 (a) and (b) and FIG. 2, reference numeral 12 indicates the section of the track recess, and 13 is a schematically illustrated aperture of the objective lens. As seen, the reflected light from the track recess 12 is incident upon the objective lens as collimated by the aperture 13 thereof.

Any deviation of the light beam with respect to the track recess 12 is detected utilizing the fact that if the light beam deviates from the track recess 12, there occurs a difference between the intensity of said positive primary diffracted light 11b and that of said negative primary diffracted light 11a. That is, when the light beam 31 is projected accurately onto the track recess 12 as shown in FIG. 3 (a), the most intense portion of the reflected light intensity 33 corresponds precisely with the track recess 12. However, when the light beam 31 is not accurately projected onto the track recess 12 as shown in FIG. 3 (b) and (c), the most intense portion of the reflected light intensity 33 is displaced rightward or leftward depending upon the extent of the deviation from the track recess 12. The light beam is positioned though detection of the reflected light intensity 33.

Next, the feature of positioning the light beam through detection of said reflected light intensity 33 will be described with reference to FIG. 4 showing the optical head. As shown in FIG. 4, the laser beam projected from a semiconductor laser device 41 is incident upon a collimation lens 42 which converts it into parallel beams. These parallel laser beams are incident upon a triangular prism 43 which corrects the short-axial intensity distribution of a laser beam emitted from the semiconductor laser device 41 and which has an elliptic intensity distribution. The laser beams from the triangular prism 43 are converged through a beam splitter 44, ¼ wavelength plate 45, tracking pivotable mirror 46 and an objective lens 47 onto the track recess 12 on the information recording surface 48 of the optical disk. The reflected light from the information recording surface 48 is split by the beam splitter 44 and then supplied to a lens 51 and a tracking detection binary photodetector 52 through a light energy-based beam splitting prism 49. The binary photodetector 52 receives the reflected light 33 as shown in FIG. 3 (a), (b) or (c) and delivers two electric signals which are proportional with the deviation between the track recess and the light beam projected thereon. These electric signals are received by a differential amplifier 53 that delivers a track deviation detection signal which is proportional with the deviation between the light beam 31 and track recess 12. This track deviation detection signal is processed in a tracking signal processing circuit (not shown) and fed back to a voice coil 54 which controls the angulation of the tracking pivotable mirror 46 to accurately position the light beam with respect to the track recess 12.

Next, focusing of the light beam will be described herebelow:

In FIG. 4, the reflected light from the information recording surface 48, namely, the reflected light from the track recess 12, is incident upon an out-focus detecting optical system 60 through the light energy-based beam splitting prism 49.

FIG. 5 shows an example of the out-focus detecting optical system 60 which is disclosed in U.S. Pat. No. 4,450,547. This out-focus detecting optical system 60 comprises a convex lens 61, cylindrical lens 62, knife edge 63 and a quad photodetector 64. The cylindrical lens 62 is optically tilted 45 degrees with respect to the track recess 12, and the knife edge 63 works to shade half of a minimum light circle of confusion (not shown) defined by the convex lens 61 and cylindrical lens 62 in a direction parallel to the track recess 12. Owing to this arrangement, a following pattern of light is projected onto the quad photodetector 74 according to an extent of out-focus of light beam with respect to the information recording surface 48. Namely, when a light spot 65 of a light beam having passed through the objective lens 47 is accurately focused on the information recording surface 48 as shown in FIG. 6, the linear portion 66L of a semicircular light pattern 66 becomes parallel to parting lines 67a and 67b of the quad photodetector 64 as shown in FIG. 7 (a). However, when the light spot 65 is not focused on the information recording surface 48 but displaced in the direction of arrow A as shown in FIG. 6, the semicircular light pattern 66 will rotate counterclockwise as shown in FIG. 7 (b). On the contrary, if the light spot is displaced in the direction of arrow B as shown in FIG. 6, the semicircular light pattern 66 rotates clockwise as shown in FIG. 7 (c). In case the light spot 65 is out of focus on the information recording surface 48 and the semicircular light pattern 66 rotates as shown in FIG. (b) and (c), an objective lens actuator 68 is so controlled that the out-focus detection signal indicative of the difference between the outputs from the detectors 64a and 64b of the quad photodetector 64 is null, thereby focusing the light spot on the information recording surface 48. The operating principle of the above-mentioned out-focus detecting optical system 60 is disclosed in the U.S. Pat. No. 4,450,547 and will not be explained in detail herein.

As described in the above, the out-focus detecting optical system 60 utilizes the reflected light from the information recording surface 48 to form semicircular light pattern 66 as shown in FIG. 7 (a), (b) and (c) for focusing the light spot on the information recording surface 48. However, if the light intensity at different portions of the semicircular light pattern 66 is not uniform even when the difference between the outputs from the detectors 64a and 64b of the quad photodetector 64 is zero, it means that no accurate focusing has been made. A first cause of the nonuniformity of light intensity at different portions of the semicircular light pattern 66 is the diffracted light from the track recess 12 and which is included in the reflected light from the information recording surface 48. But this nonuniformity of light intensity at different portions of the semicircular light pattern 66 due to this diffracted light can be eliminated by arranging the axis of symmetry 14 of the negative and positive primary diffracted lights 11a and 11b so as to nearly coincide with the parting lines 67a and 67b of the quad photodetector 64 as shown in FIG. 8. This is because owing to this arrangement, the components of the negative and positive primary diffracted lights 11a and 11b incident upon the detectors 64a to 64d of the quad photodetector 64 are equal to each other.

A second cause of the nonuniformity of light intensity at different portions of the semicircular light pattern 66 is the comatic aberration of the collimation lens 42 and objective lens 47 shown in FIG. 4. Generally, the collimation lens 42 and objective lens 47 are composed each of a combination of plural lenses to compensate for various kinds of aberration, thereby converting the reflected light beam from the information recording surface 48 into a well-collimated light beam.

However, it is difficult to completely compensate for the aberration. Even if the aberration can be initially compensated to some extent, mutual displacement between the component lenses, etc. due to changes of temperature, humidity, etc. causes the so-called "comatic aberration". Accordingly, the light intensity at different portions of semicircular light pattern 66 projected onto the quad photodetector 64 becomes nonuniform. Thus, even by controlling the objective lens actuator 68 so that the difference between the outputs from the detectors 64a and 64b of the quad photodetector 64 becomes null, there will be a case that the light spot 65 can not be accurately focused.

SUMMARY OF THE INVENTION

The present invention seeks to provide an optical head of an optical disk apparatus which can accurately focus the light beam by preventing out-focus detection from being malinfluenced by any change in light intensity of the reflected light from the information recording surface which is due to the comatic aberration of the objective and collimation lenses.

The optical head of the optical disk apparatus according to the present invention converges a laser beam from a light source and forms it into a light spot. The light spot is projected onto a track recess on the information recording surface, and the light spot is positioned and focused based on the reflected light, including diffracted light, from the information recording surface. More particularly, the optical head is so arranged that in a plane perpendicular to the optical axis of the lens composing the optical head, an angle within a predetermined range is optically formed between the direction of the central parallel ones of the S-like interference fringes indicative of the comatic aberration of the lens and the direction of the track recess.

The method, according to the present invention, of making an optical head of an optical disk apparatus comprises the steps of converging a laser beam from a light source and forming it into a light spot, projecting the light spot onto the track recess on the information recording surface, positioning and focusing the light spot, writing and reading the data based on the reflected light from the track recess, and more particularly, visually recognizing S-like interference fringes indicative of the comatic aberration of the lens, marking on the lens a direction with which the direction of the central parallel ones of the S-like interference fringes forms a predetermined angle, and arranging the lens based on the directional marking so that the direction of the central parallel fringes and that of the track recess optically form together an angle within a predetermined range.

The optical head of the optical disk apparatus and the method of making the same according to the present invention utilizes the lenses' directivity of comatic aberration. That is to say, in the case of inteference fringes of lenses developed using a well-known Fizeau type interferometer, they are parallel, straight and regularly-spaced interference fringes when the lens has no comatic aberration. But, when the lens has a comatic aberration, S-like interference fringes develop. It means that the light having passed through a lens with the above-mentioned comatic aberration is subject to a wave front curving so that the diffracted light from the track recess, etc. has a change in light intensity corresponding to the extent of the wave front curving.

As mentioned above, the optical head of an optical disk apparatus according to the present invention utilizes the above-mentioned directivity of comatic aberration. For detection of any out-focus by obtaining a differential output through photoelectric conversion of the reflected light from the track recess, reflected lights having been subject to a similar change in intensity due to a comatic aberration are projected onto at least two photoelectric converters, respectively, whereby the influence of the comatic aberration is eliminated.

Also the method of making the inventive optical head destined for use in an optical disk apparatus is to incorporate lenses in the optical head in such a manner that the reflected light having the intensity thereof subjected to a similar change due to a comatic aberration are projected onto at least two photoelectric converters, respectively.

Accordingly, a photoelectrically converted output is produced which is correctly proportional to the light-incident area of each photoelectric converter, thereby providing an accurate out-focus detection signal.

These and other objects and advantages of the present invention will be better understood from the ensuing description made by way of example of the embodiment according to the present invention with reference to the drawings.

BRIEF DESCRIPTION OF THE DRAWINGS

FIG. 1 (b) shows the change in intensity of the diffracted component included in the reflected light from the information recording surface of the optical disk;

FIG. 10 (b) shows the interference fringes when the lens has a comatic aberration.

DETAILED DESCRIPTION OF THE PREFERRED EMBODIMENTS

Figure 9:
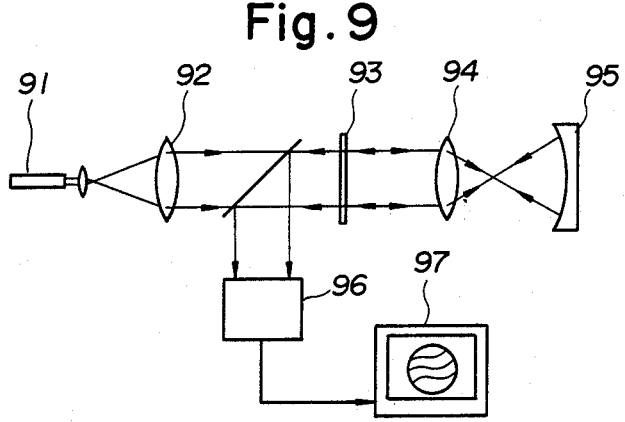
FIG. 9 shows a Fizeau type interferometer.

Referring now to FIG. 9, a well-known Fizeau type interferometer is shown which is used for finding the directivity of comatic aberration of objective and collimation lenses. In FIG. 9, the reference numeral 91 indicates a laser for light source, 92 a beam expander, 93 a reference light-transmissive plane, 94 a lens to be measured, 95 a reflective spheric surface, 96 a camera, and 97 indicates a television monitor. In this embodiment according to the present invention, the Fizeau type interferometer shown in FIG. 9 is used to monitor the inteference fringes indicative of the comatic aberration of the objective or collimation lens.

Figure 10A:
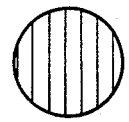
FIG. 10 (a) shows the interference fringes when the lens has no comatic aberration.
Figure 10B:
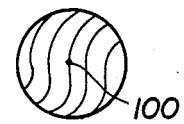

FIGS. 10 (a) and (b) show the interference fringes of the lens which are observable using the Fizeau type interferometer shown in FIG. 9. FIG. 10 (a) shows the interference fringes when the lens has no comatic aberration, while FIG. 10 (b) shows the infererence fringes when the lens has comatic aberration. The latter fringes are S-like ones. In case the lens has a comatic aberration as shown in FIG. 10 (b), the interference fringes are symmetrical with respect to a point 100.

Figure 11A:
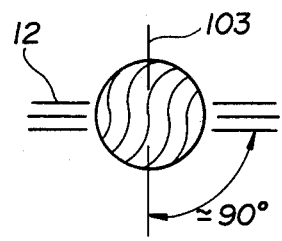
FIGS. 11 (a) and (b) show one embodiment according to the present invention.
Figure 11B:
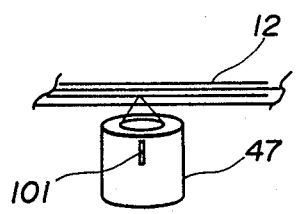

In this embodiment, as shown in FIGS. 11 (a) and (b), a marking 101 having a predetermined angular relation with an axis 103 indicative of the direction of the central parallel ones of the S-like interference fringes is provided on the barrel of the objective lens 47 (or collimation lens 42). In this embodiment, the above-mentioned predetermined angle is about 90 degrees. Next, the objective lens 47 or collimation lens 42 is incorporated in the optical head in such a manner that the marking 101 indicative of the directivity of the comatic aberration is optically nearly perpendicular to the track recess 12 with the recognition from the marking 101 of the directivity of the comatic aberration as shown in FIG. 11 (b).

Thus, the axis 103 indicative of the direction of interference fringes due to the comatic aberration can be made nearly perpendicular to the track recess 12.

Figure 1A:
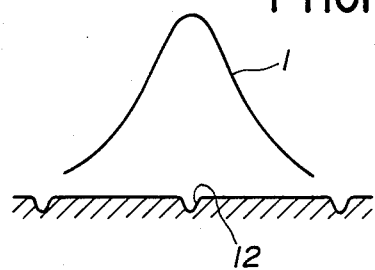
FIG. 1 (a) shows the change in intensity of reflected light from the information recording surface of the optical disk.
Figure 1B:
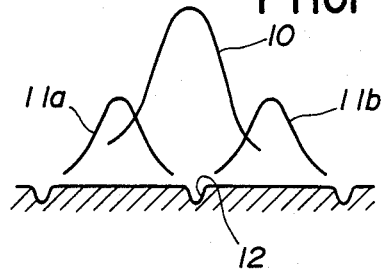
Figure 2:
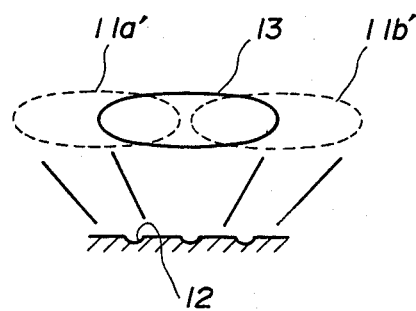
FIG. 2 is an explanatory drawing showing the relation between the positive and negative primary diffracted lights from the track recess and the aperture of an objective lens.
Figure 3A:
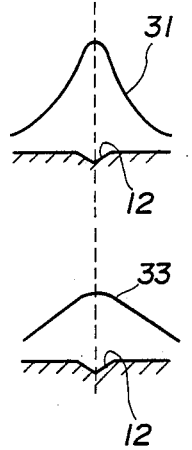
FIGS. 3 (a), (b) and (c) are explanatory drawings, respectively, showing the relation between the displacement of a light beam incident upon the track recess and the intensity of diffracted light.
Figure 3B:
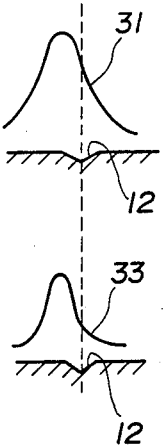
Figure 3C:
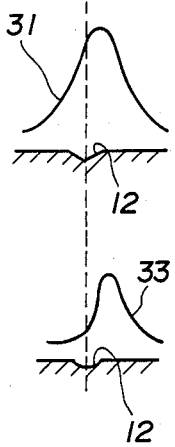
Figure 4:
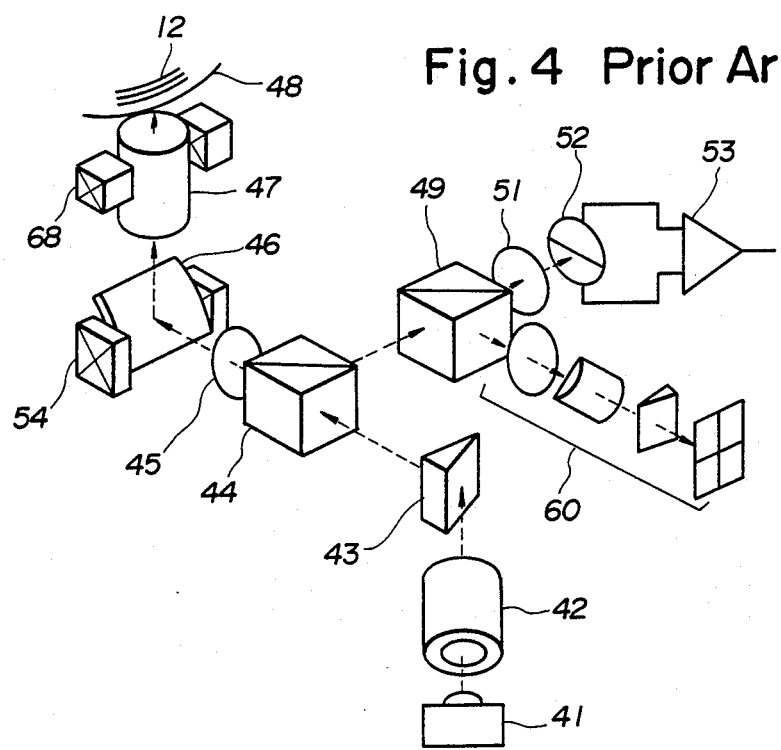
FIG. 4 shows an example of the optical head.
Figure 5:
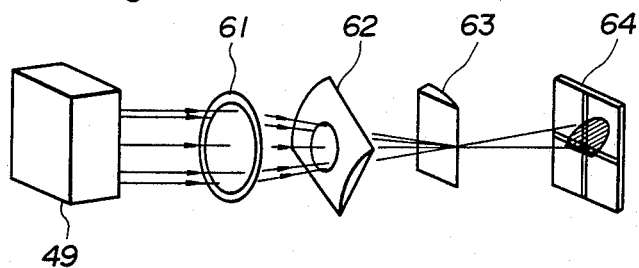
FIG. 5 shows in detail the out-focus detecting optical system in FIG. 4.
Figure 6:
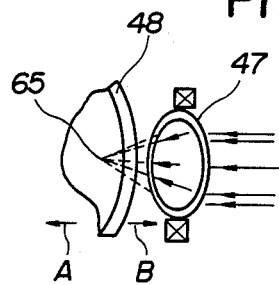
FIG. 6 shows how the light beams are converged onto the information recording surface and formed into a light spot thereon.
Figures 7A, 7B, 7C:
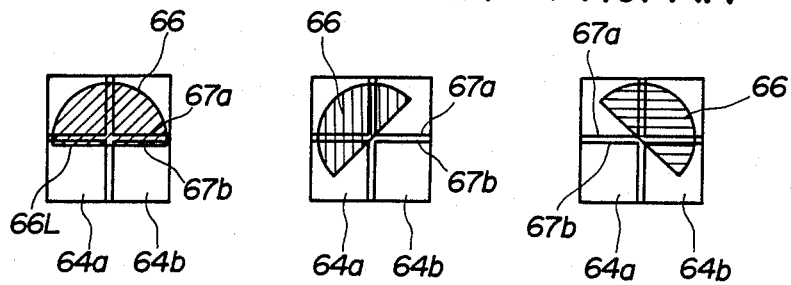
FIG. 7 (a), (b) and (c) and FIG. 8 show the examples of a semicircular light pattern projected onto the quad photodetector shown in FIG. 5 during focusing of the light beam.
Figure 8:
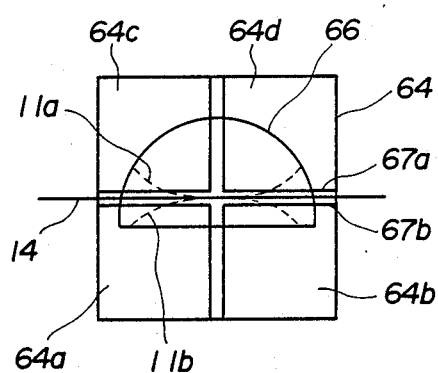

Owing to the perpendicularity to the track recess 12 to the axis 103 indicative of the directivity of the interference fringes indicative of a comatic aberration, the semicircular light pattern 66 on the quad photodetector 64 as shown in FIGS. 7 (a), (b) and (c) has a light intensity distribution horizontally symmetrical with respect to a bisector perpendicular to the linear portion 66L thereof. Thus the outputs from the detectors 64a and 64b of the quad photodetector 64 are accurately proportional with the light-incident area of the semicircular light pattern 66, thereby enabling a highly accurate focusing of the light spot 65. Accordingly, the present invention can effectively prevent the focusing from being affected by the comatic aberration even when the objective or collimation lens used in the optical head incurs a comatic aberration. Therefore, it is unnecessary to selectively use lenses which are excellent in wavefront aberration.

In the above-mentioned embodiment, the marking 101 is provided on the lens barrel in such a manner that the axis 103 and the track recess 12 are optically nearly perpendicular to each other. However, the present invention is not limited to this embodiment. The marking 101 may be provided on the lens barrel in such a manner that the axis 103 and track recess 12 have an optical relation of a predetermined angle between them.

Furthermore, the axis 103 and track recess 12 are so arranged as to be nearly perpendicular to each other. Actually, however, the allowable angle between them varies depending upon the extent of the comatic aberration of the objective lens 47 or collimation lens 42. Generally, this angle may be within a range of 60 to 120 degrees.

Although this embodiment has been explained with reference to the quad photodetector shown in FIGS. 7 (a), (b) and (c), the present invention is not limited to this embodiment. It can be adopted for an optical head using a photodetector having at least two photoelectric converters and which provides an out-focus detection signal as a differential signal.

What is claimed is:

1. An optical head for an optical disk apparatus having an optical disk with a track recess formed therein, comprising:

means for forming a light spot and means for projecting said light spot onto the track recess for reading and writing information on a recording surface of the optical disk;

means for receiving reflected light of the light spot reflected from the track recess including means for positioning and focusing said light spot onto the track recess including means having a plurality of photo detectors for receiving the reflected light and providing an output, said positioning and focusing means having means for receiving said output and generating a signal proportional to the deviation between the track recess and the light spot for controlling said light spot projecting means to minimize the deviation and thereby accurately position and focus the light spot onto the track recess;

said means for projecting said light spot onto the track recess and for receiving the reflected light from said track recess including lens means having comatic aberration such that in a plane perpendicular to an optical axis of said lens means, S-like interference fringes are created, said interference fringes having a direction of central parallel ones of the fringes; and means for positioning said lens relative to said track recess such that said direction of the central parallel ones of the fringes optically forms an angle with said track recess that is within a predetermined range.

2. An optical head according to claim 1, wherein said predetermined range is 60 to 120 degrees.

3. An optical head according to claim 2, wherein said angle is 90 degrees.

4. An optical head according to claim 1, wherein said lens means includes an objective lens.

5. An optical head according to claim 1, wherein said lens means includes a collimation lens.

6. A method of making an optical head for an optical disk apparatus that reads and writes data on an optical disk, converges a laser beam from a light source to form a light spot, projects said light spot onto a track recess on the information recording surface of the disk, positions and focuses said light spot based upon the reflected light received from said track recess, and has a lens for projecting said light spot and for receiving said reflected light, comprising the steps of:

detecting a comatic aberration of the lens including visually recognizing S-like interference fringes created in a plane of the lens perpendicular to an optical axis of the lens;

marking a direction of central parallel ones of the S-like interference fringes on said lens; and positioning said lens marking relative to said track recess so that the direction of the central parallel interference fringes optically forms an angle within a predetermined range with the direction of the said track recess.

7. A method of making an optical head according to claim 6, wherein said positioning of said lens marking optically forms said angle within a predetermined range of 60 to 120 degrees.

8. A method of making an optical head according to claim 7, including providing an objective lens as said lens.

9. A method of making an optical head according to claim 8, further including providing a collimation lens as said lens.

* * * * *